(12) United States Patent
Sato et al.

(10) Patent No.: US 8,112,621 B2
(45) Date of Patent: Feb. 7, 2012

(54) MULTI-CORE ADDRESS MAPPING FOR SELECTING STORAGE CONTROLLER PROGRAM

(75) Inventors: Nakaba Sato, Odawara (JP); Kazusige Nagamatsu, Odawara (JP); Toshiaki Terao, Odawara (JP); Hiroji Shibuya, Odawara (JP)

(73) Assignee: Hitachi, Ltd., Tokyo (JP)

( * ) Notice: Subject to any disclaimer, the term of this patent is extended or adjusted under 35 U.S.C. 154(b) by 347 days.

(21) Appl. No.: 12/526,624

(22) PCT Filed: Apr. 23, 2009

(86) PCT No.: PCT/JP2009/058539
§ 371 (c)(1),
(2), (4) Date: Aug. 10, 2009

(87) PCT Pub. No.: WO2010/122677
PCT Pub. Date: Oct. 28, 2010

(65) Prior Publication Data
US 2011/0138160 A1    Jun. 9, 2011

(51) Int. Cl.
*G06F 12/06* (2006.01)
(52) U.S. Cl. ........................................... 713/2; 711/114
(58) Field of Classification Search .................. 711/114; 713/2
See application file for complete search history.

(56) References Cited

U.S. PATENT DOCUMENTS

| | | | |
|---|---|---|---|
| 5,761,734 A | 6/1998 | Pfeffer | |
| 7,716,421 B2* | 5/2010 | Zimmer et al. | 711/114 |
| 7,818,500 B2* | 10/2010 | Nagaram Chengal | 711/114 |
| 2002/0144079 A1 | 10/2002 | Willis | |
| 2008/0091974 A1 | 4/2008 | Nakashima | |

FOREIGN PATENT DOCUMENTS

JP    2008-123439    5/2008

* cited by examiner

*Primary Examiner* — Albert Wang
(74) *Attorney, Agent, or Firm* — Brundidge & Stanger, P.C.

(57) ABSTRACT

Even if each processor core uses the same logical address, a processing-target program corresponding to each processor core can be selected. A logical address of multiple address mapping tables is set to a same logical address in correspondence with an embedded OS program or a RAID management program, and a physical address is set to a different physical address in correspondence with the actual storage destination of an embedded OS program or a RAID management program. Each processor core, on start-up, uses a self address mapping table to execute address mapping processing with each processor core based on the same logical address, selects an embedded OS program or a RAID management program according to the physical address obtained in the address mapping processing, and executes processing according to the selected program.

11 Claims, 6 Drawing Sheets

MULTI-CORE ADDRESS MAPPING FOR SELECTING STORAGE CONTROLLER PROGRAM

TECHNICAL FIELD

The present invention relates to a storage apparatus equipped with a multi-core processor configured from a plurality of processor cores, and to its program processing method and storage controller.

BACKGROUND ART

As a storage system, for example, known is a type where a host apparatus and a plurality of storage apparatuses are connected via a communication network for sending and receiving information between the host apparatus and the respective storage apparatuses. Conventionally, the storage apparatuses that are used in this type of storage system often adopt a multi CPU configuration having a plurality of CPUs as the processor.

Meanwhile, in recent years, the configuration that is often employed as the processor is a multi-core CPU (multi-core processor) configured from a plurality of CPU cores (processor cores). Here, when transferring the programs that are running on the multi CPU configuration to a system employing a multi-core CPU, an SMP (Symmetric Multi-Processing) OS (Operating System) of treating a plurality of CPU cores on the same level and virtually showing them as a single CPU is being adopted (refer to Patent Document 1).

In the foregoing case, by virtually constructing a multi CPU configuration with the programs running on the SMP OS (programs running on the host OS), the programs that were running on the multi CPU configuration (programs running on the guest OS) can be operated as is without requiring any modification.

[Related Art Documents]
[Patent Document 1]
Japanese Patent Laid-Open Publication No. 2008-123439

DISCLOSURE OF THE INVENTION

However, the SMP OS does not give sufficient consideration of its application to built-in apparatuses with limited resources. Thus, in addition to the resources required for operating the programs running on the multi CPU configuration, it is necessary to prepare resources required for running the SMP OS.

For example, a flash memory capacity for storing the SMP OS, a RAM (Random Access Memory) capacity for executing the SMP OS, and address space are required as the memory capacity.

Specifically, if the SMP OS is used as a virtualized OS, although it is possible to divert the programs running on the multi CPU configuration, pursuant to the intervention of the virtualized OS, overhead will occur in the processing, or the flash memory capacity and RAM capacity to run the SMP OS will increase, thereby causing increased costs.

The present invention was devised in view of the problems encountered by the conventional technology described above. Thus, an object of the present invention is to provide a storage apparatus and its program processing method and storage controller capable of selecting the processing-target program corresponding to each processor core even when each processor core configuring a multi-core processor uses the same logical address to designate the processing-target program to be processed by each processor core.

In order to achieve the foregoing object, the present invention prepares an address mapping table corresponding to each processor core as the address mapping table for mapping a logical address to a physical address, sets a logical address of each address mapping table as a same logical address that is common to each processor core, and sets a physical address of each address mapping table as a different physical address in correspondence with an actual storage destination of each processing-target program. Each processor core, on start-up, selects a self address mapping table and uses the selected address mapping table, uses the same logical address that is common to each processor core to execute address mapping processing, selects a processing-target program corresponding to a physical address obtained in the address mapping processing, and executes processing according to the selected processing-target program.

According to the present invention, even when each processor core configuring a multi-core processor uses the same logical address and designates a processing-target program to be processed by each processor core, it is still possible to select the processing-target program corresponding to each processor core.

BEST MODE FOR CARRYING OUT THE INVENTION

An embodiment of the present invention is now explained with reference to the attached drawings.

In this embodiment, a plurality of address mapping tables are prepared in correspondence with each processor core as an address mapping table for mapping a logical address to a physical address, a same logical address that is common to each processor core is used as a logical address of each address mapping table, and mutually different physical addresses showing an actual storage destination of a processing-target program to be used by each processor core are used as the respective physical addresses. Each processor core, on start-up, uses a self address mapping table and a same logical address that is common to each processor core to perform address mapping processing, and executes processing according to the processing-target program corresponding to the physical address obtained in the address mapping processing.

Figure 1:
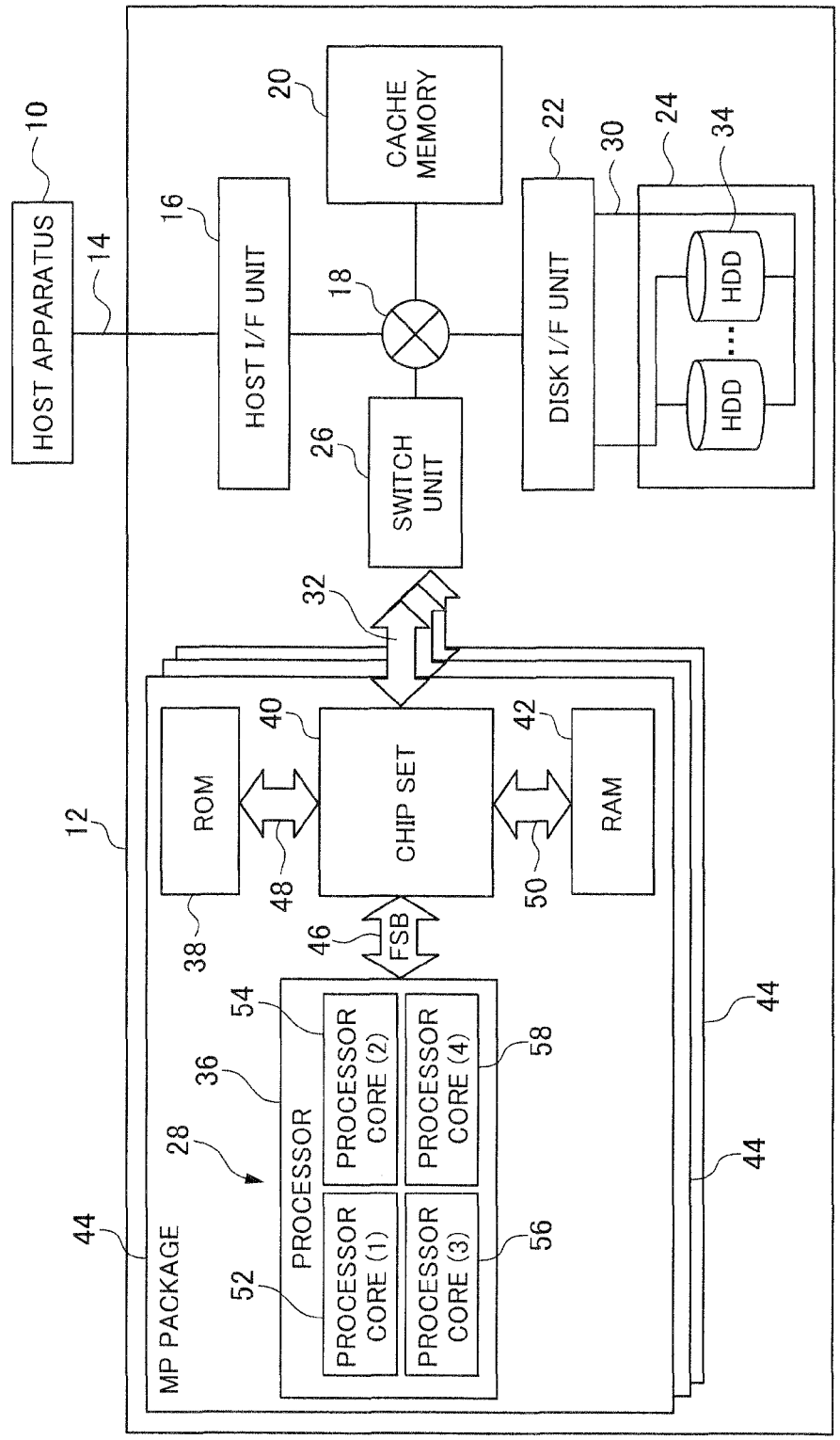
FIG. 1 is a block configuration diagram of a storage system employing the storage apparatus of the present invention.
Figure 2:
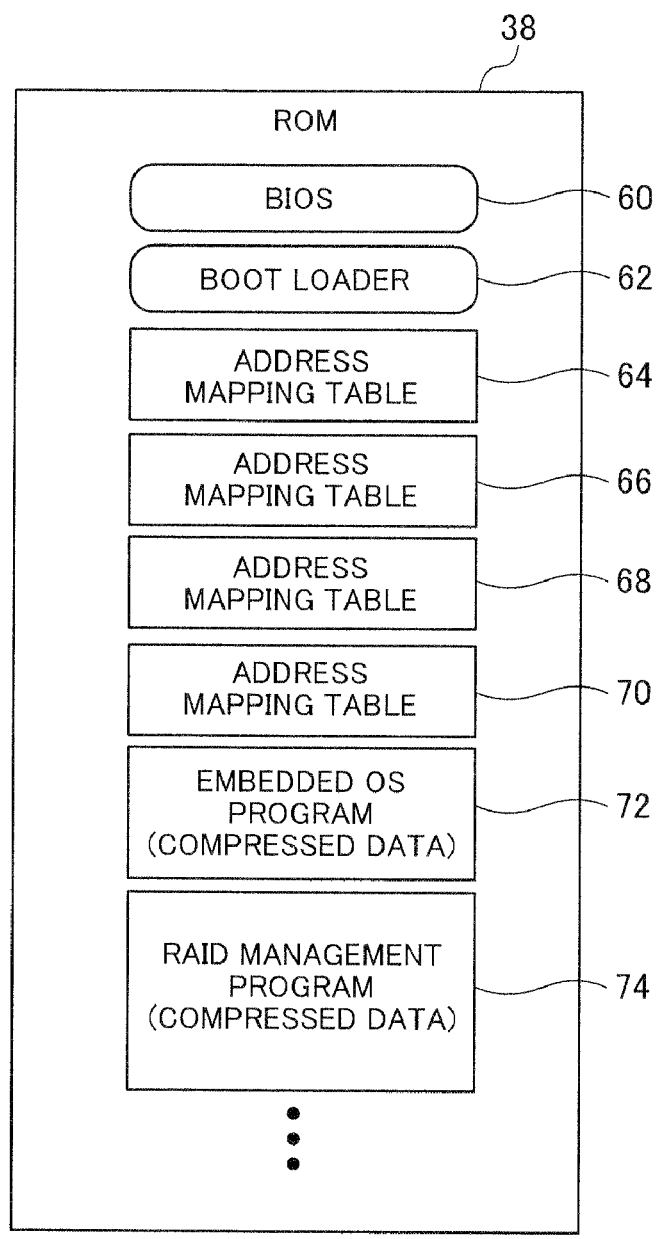
FIG. 2 is a configuration diagram explaining the configuration of a ROM.

FIG. 1 is a block configuration diagram of a storage system using a storage apparatus according to the present invention. In FIG. 1, the storage system comprises a host apparatus 10 and a storage apparatus 12, and the host apparatus 10 and the storage apparatus 12 are mutually connected via a communication network 14.

The storage apparatus 12 comprises a host interface (I/F) unit 16, an internal network 18, a cache memory 20, a disk interface (I/F) unit 22, a disk array unit 24, a switch unit 26, and a control unit 28.

The host interface unit 16, the cache memory 20, the disk interface unit 22 and the switch unit 26 are mutually connected via an internal network 18, the disk interface unit 22 and the disk array unit 24 are connective via a network 30, and the switch unit 26 and the control unit 28 are connected via an address data signal line 32.

The host interface unit 16 sends and receives information to and from the host apparatus via the communication network 14, and, upon receiving information such as commands from the host apparatus 10, transfers the received commands to the control unit 28 via the internal network 18, the switch unit 26, and the address data signal line 32. Moreover, the host interface unit 16 sends, as the processing result of the control unit 28, the processing result in response to the command as the reply information to the host apparatus 10 via the communication network 14 upon receiving such processing result in response to the command via the internal network 18.

The cache memory 20 configures a storage area (database) for temporarily storing data accompanying the processing of the control unit 28.

The disk array unit 24 comprises a plurality of hard disk drives (HDD) 34. Each hard disk drive 34 is configured as a storage unit, and, for instance, a logical storage area is set in the storage area of each hard disk drive 34. Further, each hard disk drive 34 is configured by being dividing into a plurality of RAID (Redundant Arrays of Inexpensive Disks) groups. The disk interface unit 22 controls access such as a write access or a read access to each hard disk drive 34.

The control unit 28 comprises, as a storage controller, a processor 36, a ROM (Read Only Memory) 38 configured from a flash memory, a chip set 40, and a RAM (Random Access Memory) 42, and is mounted on a package 44. The processor 36 and the chip set 40 are connected via a frontside bus 46, the ROM 38 and the chip set 40 are connected via a bus 46, and the chip set 40 and the RAM 42 are connected via a bus 48.

The package 44 is arranged in a plurality, and each package 44 is loaded with a control unit 28. The control unit 28 of each package 44 is selected by the switch unit 26, and the selected control unit 28 is connected to the internal network 18.

The processor 36 is configured, as a multi-core processor, a #0 processor core 52, a #1 processor core 54, a #2 processor core 56, and a #3 processor core 58.

Here, the #0 processor core 52 is configured as a boot strap processor (BSP), and #1 to #3 processor cores 54, 56, 58 are respectively configured as an application processor (AP). Each processor core 52 to 58 executes arithmetic processing according to the software resource, analyzes commands upon receiving commands as information from the host apparatus 10, and executes processing for controlling the hard disk drive 34 and the like according to the analytical result.

The ROM 38 stores software resources; for instance, as storage software resources, a BIOS (Basic Input Output System) 60, a boot loader 62 as the initial program loader, an address mapping table 64 to be used by the processor core 52, an address mapping table 66 to be used by the processor core 54, an address mapping table 68 to be used by the processor core 56, an address mapping table 70 to be used by the processor core 58, and an embedded OS program 72 and a RAID management program 74 as the processing-target programs of the processor core 52. The ROM 38 also stores the embedded OS program and the RAID management program as the processing-target programs corresponding to the processor cores 54, 56, 58 as compressed data.

The address mapping tables 64, 66, 68, 78 are address mapping tables for mapping a logical address that is designated during the processing of each processor core 52 to 58 starting up the boot loader 62 to a physical address showing the actual storage destination of the embedded OS program 72 and the RAID management program 74. The logical address of each address mapping table 64, 66, 68, 70 is set to the same logical address that is common to each processor core, and the physical address of each address mapping table 64, 66, 68, 70 is set to a different physical address in correspondence with the actual storage destination of programs such as the embedded OS program 72 and the RAID management program 74.

In the foregoing case, giving consideration to the fact that each embedded OS program 72 and RAID management program 74 and the logical address of each address mapping table 64, 66, 68, 70 are divided into a group assemblage according to their type, the logical address of each address mapping table 64, 66, 68, 70 is set to a different value for each group if the groups are different, and set to a same value that is common to each processor core if the groups are the same.

Figure 3:
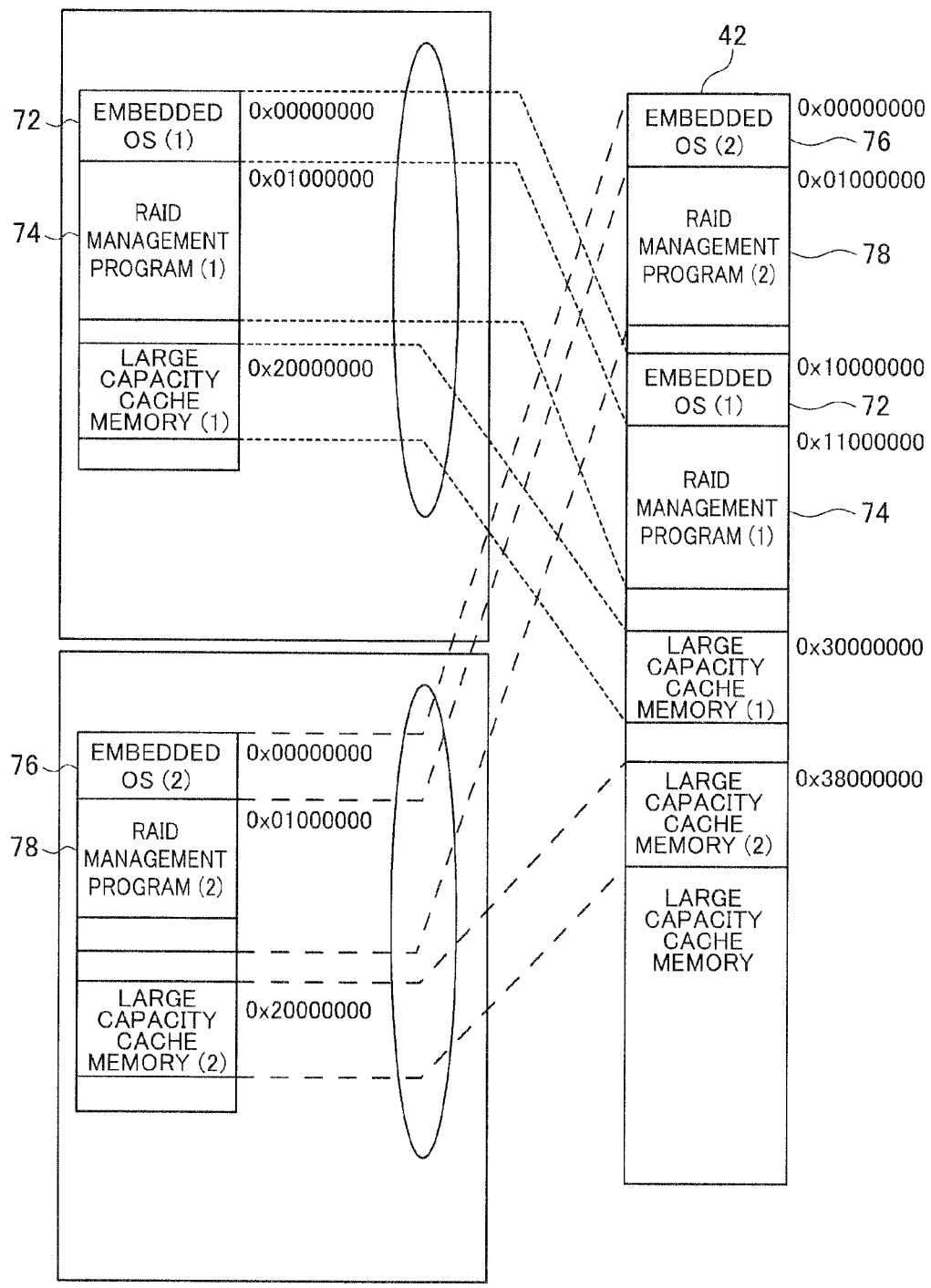
FIG. 3 is an address mapping diagram explaining the process of mapping a logical address to a physical address using an address mapping table.

For example, as shown in FIG. 3, when the top logical address among the logical address of the embedded OS program 72 used by the processor core 52 is set to "0x00000000," and the top logical address among the logical addresses of the RAID management program 74 used by the processor core 52 is set to "0x01000000," the top logical address among the logical addresses of the embedded OS program 76 of the processor core 54 is set to the same logical address of "0x00000000" as the embedded OS program 72, and the top logical address among the logical addresses of the RAID management program 78 of the processor core 54 is set to the same logical address of "0x01000000" as the RAID management program 74.

Meanwhile, the physical addresses after each logical address was mapped according to the address mapping tables 64 to 70 are set as the physical addresses deployed on the RAM 42.

For example, the top physical address among the physical addresses of the embedded OS program 72 to be used by the processor core 52 is set to "0x10000000," and the top physical address among the physical addresses of the RAID management program 74 is set to "0x11000000."

In addition, the top physical address among the physical addresses of the embedded OS program 76 to be used by the processor core 54 is set to "0x00000000," and the top physical address among the physical addresses of the RAID management program 78 is set to "0x01000000."

Thus, if the processor core 52 performs address mapping processing using the address mapping table 64 with the logical address as "0x00000000," "0x10000000" is obtained as the physical address, and the embedded OS program 72 can be selected by using this physical address "0x10000000."

Similarly, if the processor core 52 performs address mapping processing using the address mapping table 66 with the logical address as "0x000000000," "0x00000000" is obtained as the physical address, and the embedded OS program 76 can be selected by using this physical address "0x00000000."

In other words, even if the processor cores 52, 54 use the same logical address, as a result of the processor cores 52, 54 respectively using the address mapping tables 64, 66 to perform the address mapping processing, the processor cores 52, 54 are respectively able to obtain different physical addresses. Thus, the processor core 52 is able to select the embedded OS program 74 based on the physical address that was obtained by address mapping, and the processor core 54 is able to select the embedded OS program 76 based on the physical address that was obtained by address mapping.

Incidentally, the top logical address "0x200000000" among the logical addresses for user data to be used by the processor core 52 is mapped to a physical address "0x30000000" according to the address mapping table 64, and the top logical address "0x20000000" among the logical addresses for user data to be used by the processor core 54 is mapped to a physical address "0x38000000" according to the address mapping table 66.

Figure 4:
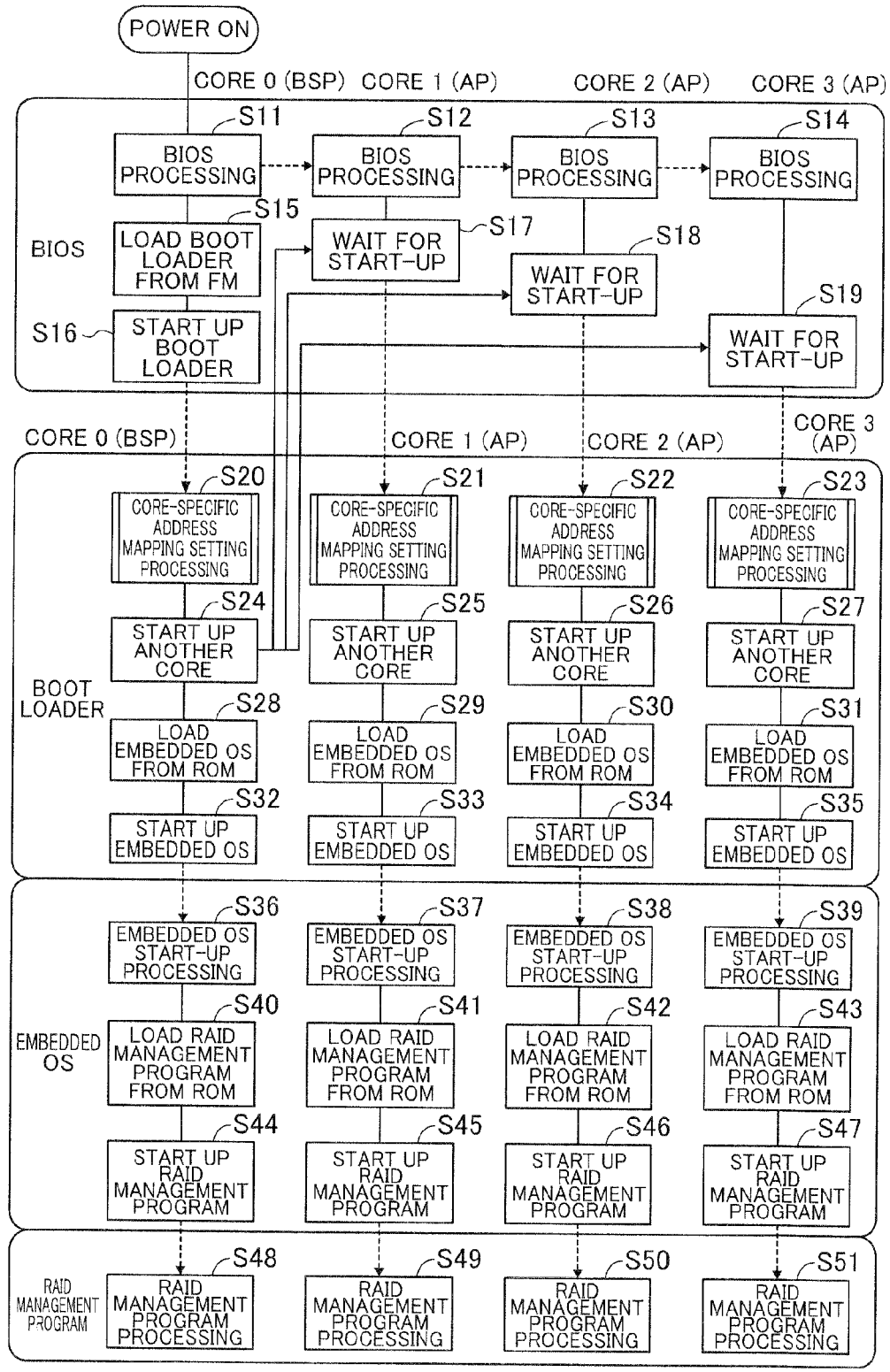
FIG. 4 is a flowchart explaining the boot processing of a multi-core processor.

The boot processing of the multi-core processor is now explained with reference to the flowchart of FIG. 4. Foremost, when the power of the control unit 28 is turned on and each processor core 52 to 58 loads the BIOS 60 from the ROM 38, the BIOS 60 of the processor cores 52 to 58 executes BIOS processing such as the initialization of the setting (S11, S12, S13, S14).

Subsequently, the BIOS 60 of the processor core 52 loads the boot loader 62 from the ROM 38 and loads it into the RAM 42 (S15), and starts up the boot loader 62 (S16). During this time, since the BIOS 60 of the processor cores 54, 56, 58 starts up the self boot loader 62 on the condition of receiving commands from the boot loader 62 of the processor core 52, it performs start-up wait processing (S17, S18, S19).

The boot loader 62 of the processor cores 52 to 58 sequentially executes core-specific address mapping setting processing subject to its start-up (S20, S21, S23). Incidentally, the boot loader 62 of the processor cores 54, 56, 58 sequentially executes the core-specific address mapping setting processing after the boot loader 62 of the processor core 52 performs the other core start-up processing at S24.

Figure 5:
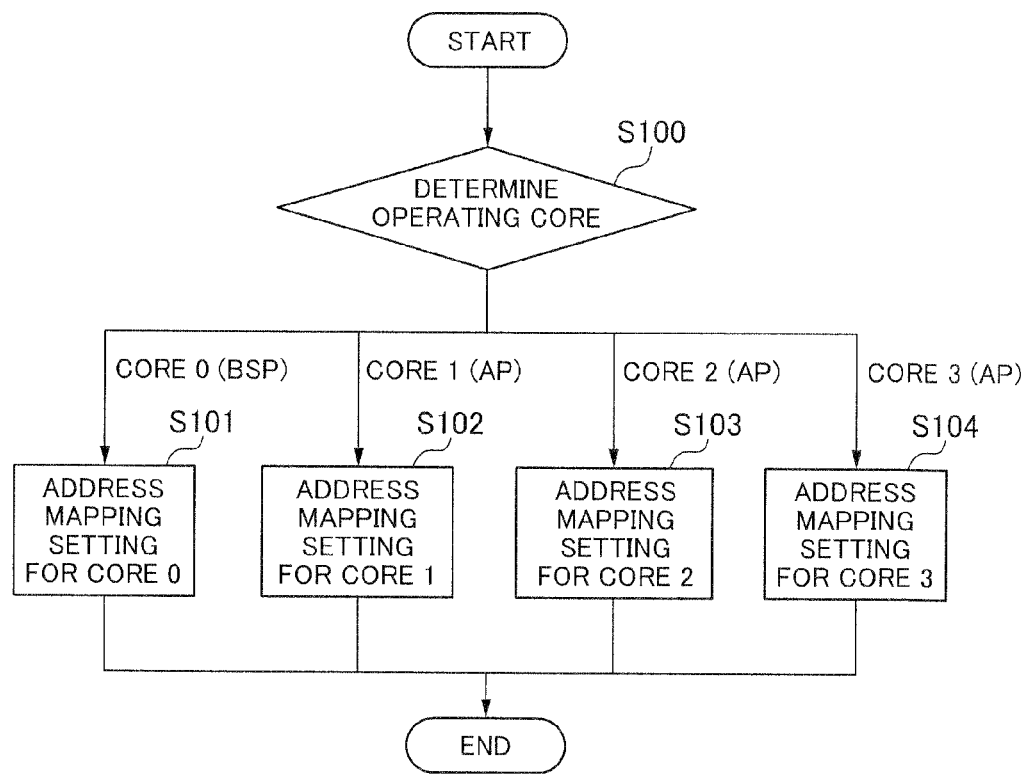
FIG. 5 is a flowchart explaining the core-specific address mapping setting processing.

Specifically, as shown in FIG. 5, the boot loader 62 of each processor core 52 to 58 determines whether each processor core is in an operational state (S100), and, when each processor core is in an operational state, sequentially performs processing for setting a physical address corresponding to each processor core for each processor core.

For example, the boot loader 62 of the processor core 52 uses the address mapping table 64 to map a logical address to a physical address, and sets the physical address obtained in the address mapping processing as the physical address for the #0 processor core 52 (S101). The boot loader 62 of the processor core 54 uses the address mapping table 66 to map a logical address to a physical address, and sets the physical address obtained in the address mapping processing as the physical address for the #1 processor core 54 (S102).

The boot loader 62 of the processor core 56 uses the address mapping table 68 to map a logical address to a physical address, and sets the physical address obtained in the address mapping processing as the physical address for the #2 processor core 56 (S103). The boot loader 62 of the processor core 58 uses the address mapping table 70 to map a logical address to a physical address, and sets the physical address obtained in the address mapping processing as the physical address for the #3 processor core 58 (S104).

After performing the address mapping setting processing, the boot loader 62 of each processor core 52 to 58 executes the other core start-up processing (S24, S25, S26, S27).

Figure 6:
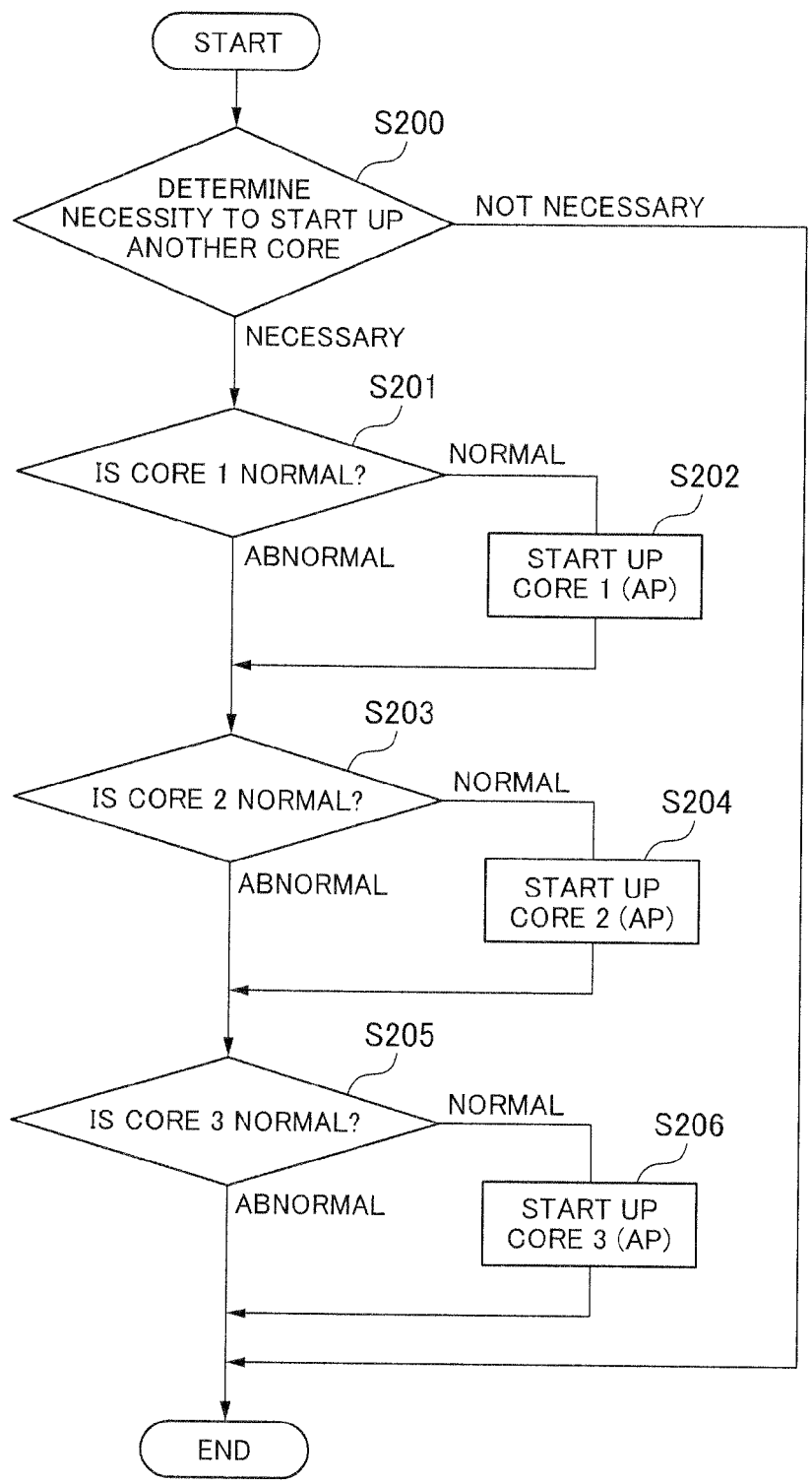
FIG. 6 is a flowchart explaining the start-up processing of another core.

Specifically, as shown in FIG. 6, the boot loader 62 of the processor core 52 determines the necessity of the other core start-up upon executing the other core start-up processing (S200), and ends this processing routine if it determines that the other core start-up is not necessary. Meanwhile, if [the boot loader 62 of the processor core 52] determines that the other core start-up is necessary, it determines whether the #1 processor core 54 is normal (S201).

If the boot loader 62 of the processor core 52 determines that the processor core 54 is normal, it outputs a command for starting up the processor core 54 to the processor core 54 (S202). Thereby, the boot loader 62 of the processor core 54 that was in a start-up wait state will be started up.

Meanwhile, if the boot loader 62 of the processor core 52 determines that the processor core 54 is abnormal, it determines whether the #2 processor core 56 is normal (S203), and outputs a command for starting up the processor core 56 to the processor core 56 upon determining that [the #2 processor core 56] is normal (S204). Thereby, the boot loader 62 of the processor core 56 that was in a start-up wait state will be started up.

Moreover, if the processor core 56 determines that [the #2 processor core 56] is abnormal, the boot loader 62 of the processor core 52 determines whether the #3 processor core 58 is normal (S205), and outputs a command for starting up the processor core 58 to the processor core 58 upon determining that it is normal (S206). Thereby, the boot loader 62 of the processor core 58 that was in a start-up wait state will be started up.

Meanwhile, if the processor core 58 determines that [the #3 processor core 58] is abnormal, the boot loader 62 of the processor core 52 ends this processing routine.

Incidentally, since the boot loader 62 of the processor cores 54, 56, 58 does not perform processing for starting up the other processor cores in the other core start-up processing, it proceeds to the subsequent processing.

Subsequently, the boot loader 62 of each processor core 52 to 58 loads the embedded OS program from the ROM 38 according to the physical address obtained in the address mapping processing and loads it into the RAM 42 (S28, S29, S30, S31), and starts up the embedded OS program (S32, S33, S34, S35).

The embedded OS program of each processor core 52 to 58 executes the embedded OS program start-up processing (S36, S37, S38, S39), loads the RAID management program from the ROM 38 based on the physical address obtained in the address mapping processing and loads it into the RAM 42 (S40, S41, S42, S43), and starts up the RAID management program (S44, S45, S46, S47).

Subsequently, the RAID management program of each processor core 52 to 58 executes processing according to the respective programs (S48, S49, S50, S51), and then ends this processing routine.

In this embodiment, the logical addresses corresponding to the embedded OSes 72, 76 among the logical addresses of the address mapping tables 64, 66, 68, 70 were respectively set to the same logical address that is common to each processor core 52 to 58 for each address mapping table 64, 66, 68, 70, the logical addresses corresponding to the RAID management programs 74, 78 were respectively set to the same logical address that is common to each processor core 52 to 58 for each address mapping table 64, 66, 68, 70, and the physical addresses of the address mapping tables 64, 66, 68, 70 were set to different physical addresses for each address mapping table 64, 66, 68, 70 in correspondence with the actual storage destination of the embedded OS programs 72, 76 or the RAID management programs 74, 78.

Thus, even if each processor core 52 to 58 uses the same logical address that is common to each processor core 52 to 58 in correspondence with the embedded OS program 72, 76 or the RAID management program 74, 78 upon executing the address mapping processing using the self address mapping table, it is able to select the embedded OS program 72, 76 or the RAID management program 74, 78 as the processing-target program that it is to process based on the physical address obtained in the address mapping processing corresponding to the respective programs, and execute processing according to the selected embedded OS program 72, 76 or the RAID management program 74, 78.

According to this embodiment, even if the processor cores 52 to 58 configuring the multi-core processor respectively use the same logical address and designate the embedded OS program 72, 76 or the RAID management program 74, 78, they are able to select the embedded OS program 72, 76 or the RAID management program 74, 78 corresponding to each processor core 52 to 58.

Moreover, according to this embodiment, since the processor cores 52 to 58 are able to respectively use the same logical address and select and process the embedded OS program 72, 76 or the RAID management program 74, 78 as the processing-target program to be processed by the processor cores 52 to 58, a part of the software resource created in a multi processor environment can be diverted upon creating the software resource.

Further, according to this embodiment, since the processor cores 52 to 58 are able to respectively use the same logical address and select and process the embedded OS program 72, 76 or the RAID management program 74, 78 as the processing-target program to be processed by the processor cores 52 to 58, it is not necessary to give consideration to multi-step address mapping processing upon creating the software resource, and it is possible to minimize the deterioration in the I/O performance caused by the overhead associated with the address mapping processing.

In addition, according to this embodiment, since the BIOS 60, the boot loader 62, the address mapping tables 64 to 70, the embedded OS programs 72, 76, and the RAID management programs 74, 78 are respectively stored as software resources in the ROM 38, it is possible to simplify the configuration in comparison to cases of distributing and storing the software resources in a plurality of memories.

[Explanation of Reference Numerals]

10 host apparatus, 12 storage apparatus, 16 host interface unit, 18 internal network, 20 cache memory, 22 disk interface unit, 24 disk array unit, 28 control unit, 34 hard disk drive, 36 processor, 38 ROM, 42 RAM, 52, 54, 56, 58 processor core, 60 BIOS, 62 boot loader, 64, 66, 68, 70 address mapping table, 72 embedded OS program, 74 RAID management program

The invention claimed is:

1. A storage apparatus, comprising:
   a host interface unit for sending and receiving information to and from a host apparatus via a communication network;
   a storage unit for storing data;
   a disk interface unit for controlling access to the storage unit; and
   a control unit for analyzing information received by the host interface unit and controlling the storage unit according to the analytical result;
   wherein the control unit includes:
   a plurality of processor cores for executing arithmetic processing according to a software resource; and
   a plurality of processing-target programs corresponding to each of the processor cores and a plurality of address mapping tables corresponding to each of the processor cores as the software resource;
   wherein each of the address mapping tables has a logical address to be used by each of the processor cores for selecting each of the processing-target programs, and a physical address showing an actual storage destination of each of the processing-target programs;
   wherein the logical address of each of the address mapping tables is set to a same logical address that is common to each of the processor cores, and the physical address of each of the address mapping tables is set to a different physical address in correspondence with the actual storage destination of each of the processing-target programs; and
   wherein each of the processor cores, on start-up, selects a self address mapping table among the plurality of address mapping tables and uses the selected address mapping table, uses the same logical address that is common to each of the processor cores to execute address mapping processing, selects a processing-target program corresponding to a physical address obtained in the address mapping processing among the plurality of processing-target programs, and executes processing according to the selected processing-target program.

2. The storage apparatus according to claim 1,
   wherein the plurality of processing-target programs include an embedded OS program and a RAID management program;
   wherein logical addresses corresponding to the embedded OS among the logical addresses of the plurality of address mapping tables are respectively set to the same logical address for each address mapping table, and logical addresses corresponding to the RAID management program are respectively set to the same logical address for each address mapping table;
   wherein physical addresses of the plurality of address mapping tables are set to a different physical address for each address mapping table in correspondence with the actual storage destination of the embedded OS program or the RAID management program; and
   wherein, upon selecting the self address mapping table, each of the processor cores uses the selected address mapping table and uses the same logical address that is common to each of the processor cores to execute the address mapping processing, selects the embedded OS program or the RAID management program as the processing-target program corresponding to the physical address obtained in the address mapping processing, and executes processing according to the selected embedded OS program or RAID management program.

3. The storage apparatus according to claim 1,
   wherein each of the processing-target programs and the logical address of each of the address mapping tables are separated into a group assemblage according to their type;
   wherein the logical address of each of the address mapping tables is set to a value that is different for each of the groups when the groups are different, and set to a same value that is common to each of the processor cores when the groups are the same; and
   wherein each of the processor cores executes address mapping processing for each of the groups, selects a processing-target program corresponding to a physical address obtained in the address mapping processing of each of the groups among the processing-target programs, and executes processing according to the selected processing-target program of each of the groups.

4. The storage apparatus according to claim 1,
   wherein the plurality of processing-target programs and the plurality of address mapping tables are respectively stored in a same memory.

5. The storage apparatus according to claim 1,
wherein the memory stores a plurality of boot loaders as an initial program loader corresponding to each of the processor cores; and
wherein each of the processor cores, on the condition that power is turned on as the start of the start-up, executes processing for sequentially importing a self boot loader from the memory, and selects the address mapping table according to the imported boot loader.

6. A program processing method of a storage apparatus comprising a host interface unit for sending and receiving information to and from a host apparatus via a communication network; a storage unit for storing data; a disk interface unit for controlling access to the storage unit; and a control unit for analyzing information received by the host interface unit and controlling the storage unit according to the analytical result;
wherein the control unit includes a plurality of processor cores for executing arithmetic processing according to a software resource; and a plurality of processing-target programs corresponding to each of the processor cores and a plurality of address mapping tables corresponding to each of the processor cores as the software resource;
wherein each of the address mapping tables has a logical address to be used by each of the processor cores for selecting each of the processing-target programs, and a physical address showing an actual storage destination of each of the processing-target programs;
wherein the logical address of each of the address mapping tables is set to a same logical address that is common to each of the processor cores, and the physical address of each of the address mapping tables is set to a different physical address in correspondence with the actual storage destination of each of the processing-target programs; and
wherein each of the processor cores, as steps to be processed on start-up, performs:
a step of selecting a self address mapping table among the plurality of address mapping tables;
a step of executing address mapping processing by using the address mapping table selected in the foregoing step and using the same logical address that is common to each of the processor cores;
a step of selecting a processing-target program corresponding to a physical address obtained in the address mapping processing of the foregoing step among the plurality of processing-target programs; and
a step of executing processing according to the selected processing-target program.

7. The program processing method of a storage apparatus according to claim 6,
wherein each of the processing-target programs and the logical address of each of the address mapping tables are separated into a group assemblage according to their type;
wherein the logical address of each of the address mapping tables is set to a value that is different for each of the groups when the groups are different, and set to a same value that is common to each of the processor cores when the groups are the same; and
wherein each of the processor cores, as steps to be processed on start-up, performs:
a step of executing address mapping processing for each of the groups;
a step of selecting a processing-target program corresponding to a physical address obtained in the address mapping processing of each of the groups among the processing-target programs; and
a step of executing processing according to the selected processing-target program of each of the groups.

8. A storage controller, comprising:
a plurality of processor cores for executing arithmetic processing according to a storage software resource; and
a plurality of processing-target programs corresponding to each of the processor cores and a plurality of address mapping tables corresponding to each of the processor cores as the storage software resource;
wherein each of the address mapping tables has a logical address to be used by each of the processor cores for selecting each of the processing-target programs, and a physical address showing an actual storage destination of each of the processing-target programs;
wherein the logical address of each of the address mapping tables is set to a same logical address that is common to each of the processor cores, and the physical address of each of the address mapping tables is set to a different physical address in correspondence with the actual storage destination of each of the processing-target programs; and
wherein each of the processor cores, on start-up, selects a self address mapping table among the plurality of address mapping tables and uses the selected address mapping table, uses the same logical address that is common to each of the processor cores to execute address mapping processing, selects a processing-target program corresponding to a physical address obtained in the address mapping processing among the plurality of processing-target programs, and executes processing according to the selected processing-target program.

9. The storage controller according to claim 8,
wherein the plurality of processing-target programs include an embedded OS program and a RAID management program;
wherein logical addresses corresponding to the embedded OS among the logical addresses of the plurality of address mapping tables are respectively set to the same logical address for each address mapping table, and logical addresses corresponding to the RAID management program are respectively set to the same logical address for each address mapping table;
wherein physical addresses of the plurality of address mapping tables are set to a different physical address for each address mapping table in correspondence with the actual storage destination of the embedded OS program or the RAID management program; and
wherein, upon selecting the self address mapping table, each of the processor cores uses the selected address mapping table and uses the same logical address that is common to each of the processor cores to execute the address mapping processing, selects the embedded OS program or the RAID management program as the processing-target program corresponding to the physical address obtained in the address mapping processing, and executes processing according to the selected embedded OS program or RAID management program.

10. The storage controller according to claim 8,
wherein each of the processing-target programs and the logical address of each of the address mapping tables are separated into a group assemblage according to their type;
wherein the logical address of each of the address mapping tables is set to a value that is different for each of the groups when the groups are different, and set to a same value that is common to each of the processor cores when the groups are the same; and wherein each of the processor cores executes address mapping processing for each of the groups, selects a processing-target program corresponding to a physical address obtained in the address mapping processing of each of the groups among the processing-target programs, and executes processing according to the selected processing-target program of each of the groups.

11. The storage controller according to claim 8,
wherein the plurality of processing-target programs and the plurality of address mapping tables are respectively stored in a same memory.

* * * * *